July 21, 1931.  C. R. RANEY ET AL  1,815,327
PICK-UP ATTACHMENT FOR HARVESTER THRASHERS
Filed Sept. 30, 1927   3 Sheets-Sheet 1
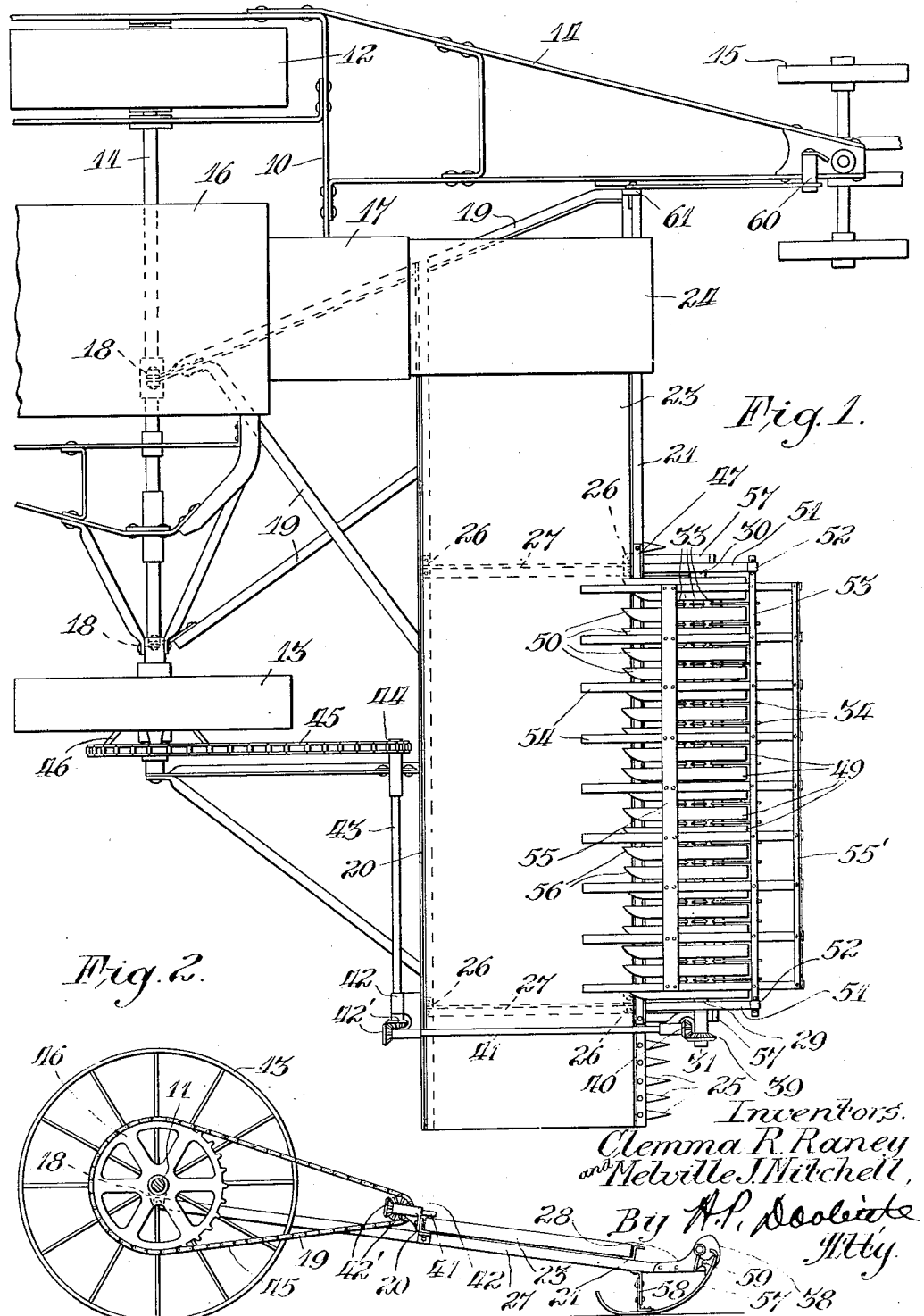

July 21, 1931.   C. R. RANEY ET AL   1,815,327
PICK-UP ATTACHMENT FOR HARVESTER THRASHERS
Filed Sept. 30, 1927   3 Sheets-Sheet 2
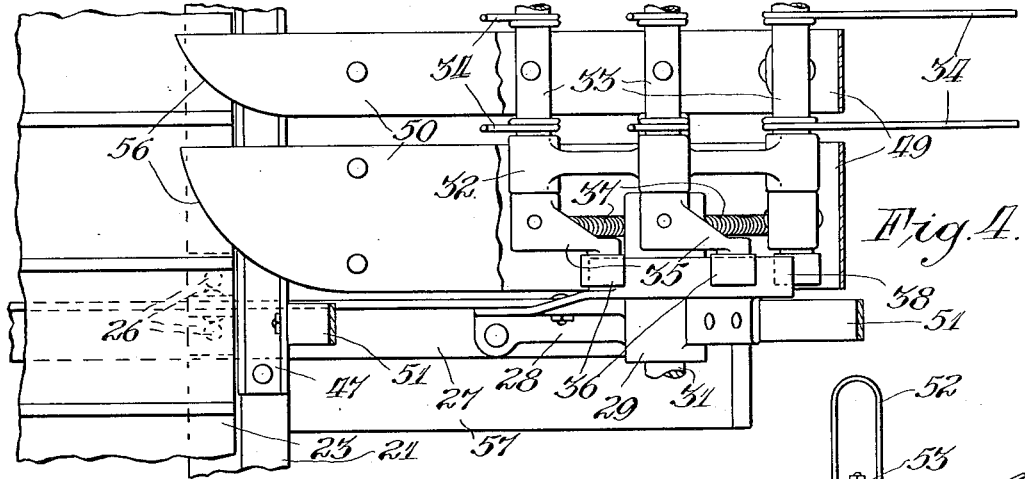
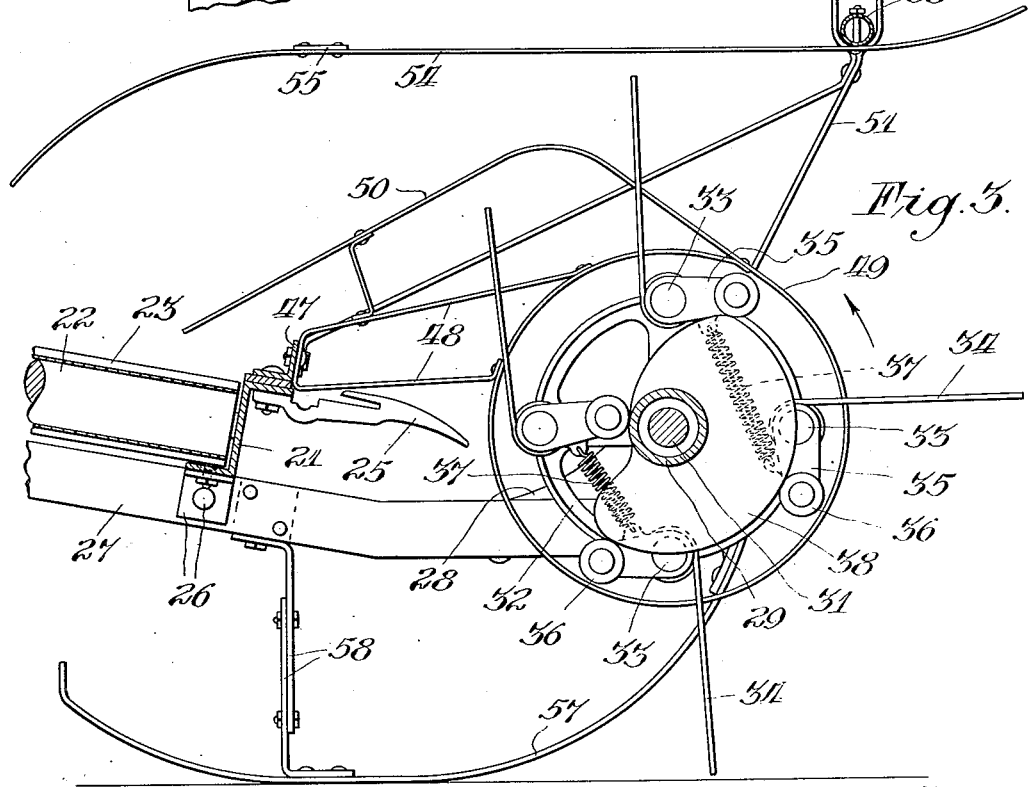
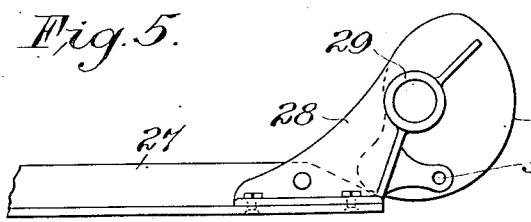
Inventors.
Clemma R. Raney
and Melville J. Mitchell,
By H. P. Doolittle
Atty.

July 21, 1931. C. R. RANEY ET AL 1,815,327
PICK-UP ATTACHMENT FOR HARVESTER THRASHERS
Filed Sept. 30, 1927  3 Sheets-Sheet 3

Inventors.
Clemma R. Raney
and Melville J. Mitchell,
By H. P. Doolittle
Atty.

Patented July 21, 1931

1,815,327

UNITED STATES PATENT OFFICE

CLEMMA R. RANEY, OF RIVERSIDE, AND MELVILLE J. MITCHELL, OF CHICAGO, ILLINOIS, ASSIGNORS TO INTERNATIONAL HARVESTER COMPANY, A CORPORATION OF NEW JERSEY

PICK-UP ATTACHMENT FOR HARVESTER THRASHERS

Application filed September 30, 1927. Serial No. 222,960.

The invention relates to harvester thrashers.

These machines as now known comprise a wheel-carried, transverse axle supporting a frame on which is located, at the grainward side, a transverse cutting and gathering platform, including a laterally moving conveyer. The opposite side of the frame, that is, the stubbleward side, carries a longitudinally arranged thrasher part, forwardly of which is a feeder housing enclosing a conveyer leading to the thrasher part and communicating at its front end with the platform conveyer already mentioned. These machines cut, gather and thrash the grain in a single passage through the field, the prerequisite condition to their use, if efficient thrashing is to be accomplished, being that the grain cure, or dry out, properly on the standing stalks. Necessarily then, these machines are limited in their use to such geographical localities which are satisfactorily non-humid in their climates to create the ideal harvester thrasher conditions. The use of these machines entails great savings in cost, time and labor, and prevents much grain wastage, and so it necessarily follows that farmers in humid geographical regions, where grain will not ripen on the standing stalk, are at a decided disadvantage in the matter of production costs, as they must rely upon the relatively costly, old established methods. Obviously then, it would be a benefit to farmers of the humid regions if they could employ harvester thrashers in their harvest operations. And so it follows that implement manufacturers have been confronted with the problem of adapting harvester thrashers to the humid regions, and making them usable.

The situation is being met by a first harvest operation of cutting a wide swath of grain and laying it out in windrows on the grain stubble, thus permitting wind and sun to ventilate and cure the grain in this manner, as well as to wither and dry out weeds. The swathing can be accomplished by converting old grain binders or by employing special swathers to do this work of forming a windrow. The grain under ordinary circumstances should cure satisfactorily in the windrow and be ready for thrashing in two or three days. After the windrow has cured, it only remains to adapt the harvester thrasher for picking up the windrow and then feeding it along the platform conveyer to the feeder for the thrasher part. Thus, a pick-up device is substituted for the usual platform cutting mechanism.

More particularly, then, the invention relates to a pick-up attachment for the platform of a harvester thrasher, such attachment designed to serve as a substitute for the usual cutting mechanism and reel of such machines.

The objects of the invention are to provide a pick-up attachment for the purpose stated; to provide a simple means for easily and quickly attaching and detaching the pick-up to and from the platform; to provide a raking device for raking or picking up a windrow; to provide a novel flexible grain deck structure for said pick-up or rake device; to provide a novel packer mechanism for said deck structure; and, lastly, generally to improve harvester thrasher pick-up attachments.

Briefly, these desirable objects are accomplished in the provision of a pick-up attachment designed as a substitute for the usual platform cutting mechanism and reel of a harvester thrasher. The attachment comprises frame bars adapted for easy attachment to and detachment from the frame bars of the harvester thrasher platform. The pick-up frame bars are carried at their forward ends on a pair of ground supporting members. The frame bars extend forwardly of the platform when attached thereto and carry a transversely disposed driven shaft, which carries a toothed raking cylinder. A cam structure is carried on one of the pick-up frame bars for causing the rake bars of the device to operate in a manner to move the rake teeth with a proper sweeping and pick-up action, to pick up grain in the most effective manner. A transverse bar is designed for detachable connection to the harvester thrasher platform or to the frame bars, which bar carries forwardly extending brackets to which are connected grain deck strips which cooperate with the rake. These strips are flexible and mounted independently of each other, and spaced apart to provide passageways for the teeth of the rake drum. The deck communicates with the harvester thrasher platform so that the grain will be properly conveyed to said platform. In a modified form, these strips may loosely rest on a rotatable roller adjacent the front edge of the platform. Carried above the grain deck is a novel floating packer structure for assisting in moving the grain onto the platform.

Looking now to the accompanying sheets of drawings showing a practical embodiment of this invention, it will be seen that:

Figure 1 is a plan view of a harvester thrasher showing a platform with the improved pick-up attachment associated therewith;

Figure 2 is a side elevational view of the construction as viewed from the grainward side, showing certain of the details;

Figure 3 is an enlarged side elevational, detail view showing the structure of the pick-up attachment and the manner of its connection to the harvester thrasher platform;

Figure 4 is a plan view of the structure shown in Figure 3;

Figure 5 is a detail view of the cam mounting;

Figure 6:
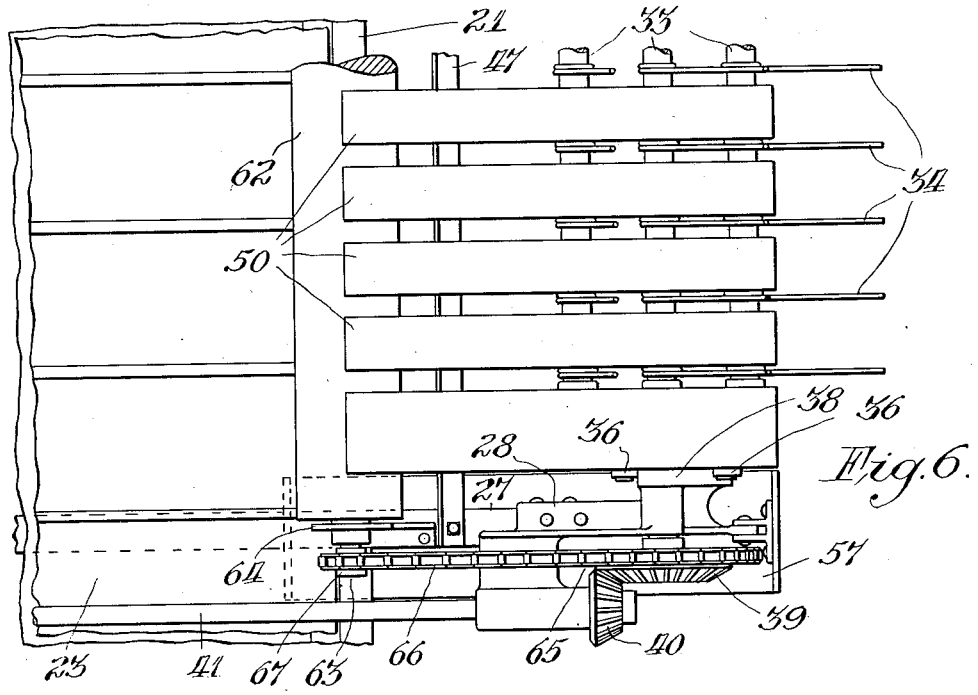
Figure 6 is a detail, fragmentary plan view of a modified pick-up attachment including the roller heretofore mentioned.

A standard form of harvester thrasher has been illustrated, which comprises a main frame 10 rigidly mounted on a transverse axle 11, which axle is journaled in a main wheel 12 and a grain wheel 13. At its stubbleward side, the main frame 10 includes a forwardly extending A-frame part 14 supported on a steering wheel truck 15. The main frame 10 adjacent its stubbleward side supports, in any approved manner, the usual thrasher housing 16, and forwardly thereof, the thrasher cylinder housing 17.

The axle 11 carries brackets 18 at spaced points along its grainward end, to which brackets are pivotally connected crossed frame bars 19, said bars supporting, in the usual way, a transverse angle bar 20, and forwardly thereof, the usual transverse Z-bar 21. Journaled in a conventional manner at the grainward end of the bars 20 and 21 is the platform roller 22 over which is trained the platform conveyer apron 23, which operates to move grain stubblewardly, and communicates with a feeder housing 24 resting on the Z-bar 21 and communicating with the thrasher cylinder housing 17, as shown in Figure 1.

In conventional harvester thrashers guard fingers 25 are connected to the Z-bar 21 and a cutting mechanism, not shown, cooperates with these fingers for the purpose of cutting the grain, while a reel, also not shown, conventionally cooperates with such cutting mechanism to lay the grain on the platform conveyer. This cutting mechanism and reel thus cut the grain and place it on the platform conveyer 23 along which it moves into the feeder housing 24, and then through the cylinder housing 17 and thrasher housing 16, for separation and cleaning.

As explained in the introduction to this specification, it is desirable that a pick-up device be substituted for these usual cutting and reel mechanisms, so as to enable these harvester thrashers to be used in localities where the grain does not cure satisfactorily on the standing stalk. Accordingly, in such localities the grain will be cut in advance and formed into windrows, and the pick-up attachment about to be described is then used for loading the windrows onto the platform conveyer 23.

Detachably connected by simple bracket and bolt devices indicated at 26 to the angle bar 20 and Z-bar 21, on their under sides, are longitudinally extending frame members 27, which protrude forwardly of the Z-bar 21 a substantial distance. The grainward frame member 27 carries a bracket 28 formed with a journal 29, while the stubbleward frame member 27 is provided with a journal 30. These journals 29 and 30 rotatably carry a transversely disposed driven shaft 31, said shaft at its ends being provided with a carrier disk 32, which disks turnably carry rake tooth shafts 33 on which are mounted rake teeth 34. Each rake shaft 33 at its grainward end is provided with a crank 35 carrying a roller 36, adjacent cranks 35 being connected by springs 37 to hold the rollers 36 spring pressed against a cam 38 formed as a part of the bracket 28, as best illustrated in Figures 3 and 5.

The drive for this toothed raking structure will now be described. The grainward end of the shaft 31 carries a bevel pinion 39 in mesh with a bevel gear 40 on a longitudinal shaft 41 arranged above the apron conveyer 23, as shown in Figure 1, said shaft having its rear end journaled in a bracket 42 mounted on the angle bar 20. This shaft 41 at its rear end is connected by suitable bevel gears 42' to a line shaft 43 arranged transversely at the rear of the platform, said line shaft 43 being connected by a sprocket wheel 44 and a longitudinally extending chain 45 to a relatively large sprocket wheel 46 formed as a part of, or detachably connected to, the grain wheel 13 of the harvester thrasher. It can now be seen that as the harvester thrasher moves through the field, the grain wheel 13 and the transmission connections just described cause the rake shaft 31 to rotate in a counter-clockwise direction, as seen in Figure 3, whereby the teeth 34 guided by the cam 38 move with a sweeping raking action properly to pick up the grain. The cam thus acts to change the angularity of the rake teeth while the rake rotates. A means in the form of a deck structure has been provided for causing the grain picked up by the toothed drum to be moved onto the platform apron conveyer 23.

Figure 7:
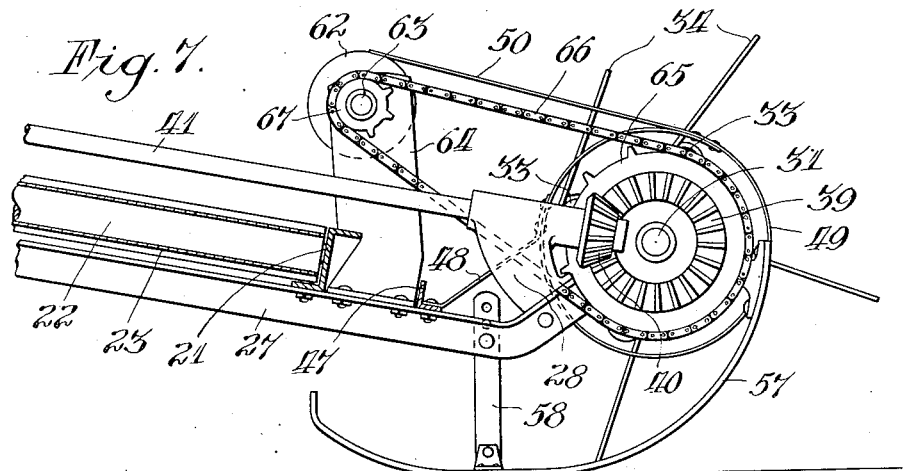
Figure 7 is an end view of the structure shown in Figure 6, the packer being left out of Figures 6 and 7.

The pick-up attachment, therefore, includes an angle bar 47 designed to be detachably connected across the top of the Z-bar 21, as shown in Figure 3, or across the frame bars 27, as shown in Figure 7. This bar 47 carries a series of spaced brackets 48, each bracket carrying a deck strip member 49, said strip 49 being circular to surround the toothed raking member. These deck strips 49 are spaced apart to provide passageways for the raking teeth 34, and are preferably made of flexible sheet metal, so that they can float independently of each other on their respective supporting brackets 48, which also are flexible. Each strip 49 includes deck extension strips 50 which extend rearwardly to a point above the platform conveyer 23. It can now be seen that, as the teeth 34 move upwardly and rearwardly, the grain will be stripped from the teeth and be pushed over the deck 50 and rearwardly onto the apron conveyer 23.

To prevent the grain from fluffing up too loosely on this grain deck just described, a novel form of packer mechanism is provided which will now be described. At each end, the bar 47 and end strips 49 carry uprights 51, said uprights including vertical guideways 52, in which guideways is floatingly mounted a transverse bar 53, which bar carries packer strips 54 extending rearwardly above the grain deck extensions 50 and back over the platform conveyer 23, as shown in Figures 1 and 3. A suitable cross plate 55 is provided to hold these strips 54, which are flexible and resilient, together at their rear ends. Another cross plate 55' holds the forward ends of these strips. It can now be seen that this structure yieldingly acts as a compressor or packer and holds the grain against the deck 50 and also down against the apron conveyer 23, so that said conveyer apron can aggressively engage the grain for moving it stubblewardly along said apron conveyer 23.

For the purpose of preventing the deck strips 50 from acting as an impediment to the conveyance of grain along the apron 23, each of said strips 50 has its stubbleward end rounded off, as at 56, so that the moving stream of grain on the conveyer 23 can easily pass said strips 50 without being unduly retarded.

Supporting means, of course, must be provided for carrying the raking structure, and such means comprises a shoe 57, one arranged under each frame bar 27 by means of a vertically adjustable bracket 58, the forward end of the shoe being pivotally connected at 59 to the bracket 28.

The usual lever adjustment means 60 is indicated in Figure 1, for pulling up or pushing down on the Z-bar 21 at 61 to raise or lower the harvester platform, as is usual in this art, and in this structure the pick-up device would, of course, move with the platform.

In the modification of the pick-up attachment shown in Figures 6 and 7, it will be seen that a roller 62 is journaled by means of a shaft 63 in a bracket 64, one on each of the frame bars 27, as will be understood (only one, however, being shown). The gear 39 has formed with it, a sprocket wheel 65 around which is trained a chain 66 connected to drive a sprocket wheel 67 and in this manner rotate the roller 62. The rear ends of the deck strips 50 loosely rest on this roller. The roller performs the function of stripping the grain off the strips 50 and assists generally in the transfer of grain from the grain deck onto the platform conveyer 23.

The floating packer structure already described may be used with the modified pick-up, or it may be dispensed with when conditions permit.

In operation, the harvester thrasher is moved through the field in a conventional manner with the pick-up attachment detachably secured to the angle bar 20 and Z-bar 21, as has been described, the carrying means 57 preferably being a part of the frame bars 27, so as to be removed bodily therewith from the harvester thrasher platform. These frame members 27 carry the rake shaft 31 and the rake structure described, said shaft being driven from the harvester thrasher grain wheel 13 by driving connections heretofore mentioned. Thus, the rake teeth move in a counter-clockwise direction as viewed in Figure 3, to pick up the grain or the windrow and load it onto the deck 50 from where it moves down onto the apron conveyer 23. The packer structure 54 described yieldingly and floatingly packs down the grain so that the apron conveyer 23 can more aggressively move the same along. The grain goes into the feeder housing 24, thence to the thrasher cylinder housing 17 and thrasher 16 for separation and cleaning, as is conventional in this art.

An important feature of the invention resides in the ground wheel drive for rotating the rake pick-up device, because the material to be gathered lies on the ground and, as a result, there exists a definite relationship between the rate of travel of the harvester thrasher and the volume of material handled by the rake device. This relationship makes for efficient operation of the rake device under all conditions of speed of travel.

It can now be appreciated that all of the desirable objects of this invention are achieved by the structure described and that the same is simple, light and compact and can be easily attached to or detached from the harvester thrasher platform as a unit with a minimum of effort.

It is the intention to cover all such changes and modifications of the illustrative embodiment herein shown as do not materially depart from the spirit and scope of the invention as indicated in the following claims.

What is claimed as new is:

1. A pick-up attachment for the platform of a harvester thrasher, said attachment comprising frame members adapted for connection to the platform and to extend in advance thereof, a raking device carried by said members, a grain deck for said raking device, and a yielding packer to pack the grain against the deck and the platform.

2. A pick-up attachment for the platform of a harvester thrasher, said attachment comprising frame members adapted for connection to the platform and to extend in advance thereof, a raking device carried by said members, a grain deck for said raking device, and a floatingly mounted device included in the attachment for packing the grain against the deck and the platform.

3. A pick-up attachment for the platform of a harvester thrasher, said attachment comprising frame members adapted for connection to the platform and to extend in advance thereof, a rake carried by said members, a grain deck for said rake, guide members carried by the attachment, a transverse bar floatingly carried by the guide members, and a flexible packer structure carried by said bar.

4. The combination with a harvester thrasher having a wheel support and a platform, of a pick-up attachment for said platform, the attachment including frame members adapted for connection to the platform, a shaft on the frame members, a rotatable toothed pick-up rake on the shaft, means for changing the angularity of the teeth as the rake rotates, and means for driving the rake from the harvester thrasher wheel support.

5. The combination with a harvester thrasher having a wheel support and a platform, of a pick-up attachment for said platform, the attachment including frame members adapted for connection to the platform, ground supports for the forward ends of the frame members, a shaft on the frame members, a rotatable toothed pick-up on the shaft, means including a cam on one of the frame members for changing the angularity of the raking teeth as the pick-up rotates, and means for driving the pick-up shaft from the harvester thrasher.

6. The combination with a harvester thrasher having a grain wheel and a platform, of a pick-up attachment for said platform, the attachment comprising frame members adapted for connection to the platform, a rotatable pick-up carried on said frame members in advance of the platform, a grain deck for the pick-up to help load the grain onto the platform, and means for driving the pick-up from the grain wheel.

7. The combination with a harvester thrasher having a grain wheel and a platform, of a pick-up attachment for said platform, the attachment comprising frame members adapted for connection to the platform, said members extending forwardly of the platform and being carried on ground supporting members, a pick-up carried on said frame members in advance of the platform, a yielding grain deck included in the attachment for co-operating with the pick-up to load the grain onto the platform, and means for driving the pick-up from the grain wheel.

8. The combination with a harvester thrasher having a wheel support and a platform, of a pick-up attachment for said platform, the attachment including frame members adapted for connection to the platform, a pick-up device on the frame members in advance of the platform, a grain deck co-operating with the pick-up for loading the grain onto the platform, a floating packer device cooperating with the grain deck and platform, and means for driving the pick-up device.

9. A pick-up attachment for the platform of a harvester thrasher, said attachment comprising a frame, a shaft, a rake device on the shaft, a grain deck between the device and platform, and a rotatable roller cooperating with said deck and arranged therebeneath.

10. A pick-up attachment for the platform of a harvester thrasher, said attachment comprising a frame, a shaft, a rake device on the shaft, a grain deck comprising strips between the device and platform, and a rotatable roller for stripping said deck strips.

11. A pick-up attachment for the platform of a harvester thrasher, said attachment comprising a frame, a shaft, a rake device on the shaft, a grain deck comprising strips between the device and platform, a rotatable roller for supporting the rear ends of the strips, and means for driving the roller from said shaft.

12. A pick-up attachment for the platform of a harvester thrasher, the harvester thrasher including supporting wheels, said attachment comprising a rotatable rake device secured to the platform, and means connecting said device to one of the wheels for rotating said device.

13. The combination with a harvester thrasher having a platform and a grain wheel, of a rotatable rake pick-up device attached to the platform, and means for driving said device from the grain wheel.

14. A pick-up attachment for the platform of a harvester thrasher, said attachment comprising a frame, a shaft, a rake device on the shaft, a grain deck comprising spaced flexible strips between the device and platform, and a roller, said strips having their rear free ends resting loosely on said roller.

15. The combination with a harvester thrasher having a platform, of a pick-up attachment for said platform, the attachment comprising frame members adapted for connection to the platform and to extend forwardly thereof, a transverse shaft journaled on the frame members, a rake device on the shaft, brackets on the frame members, a transverse roller carried by said brackets and adapted to be arranged adjacent the front edge of the platform, and a grain deck comprising spaced, flexible strips surrounding the rake device and having rearwardly extended free ends resting on said roller.

16. A pick-up attachment for the platform of a harvester thrasher, said attachment comprising frame bars, a shaft journaled thereon, a toothed rake cylinder on the shaft, separate circular strips surrounding the cylinder to provide tooth passage-ways therebetween, a cross bar carrying connections for mounting each circular strip spaced away from and forwardly of said cross bar, grain deck strips connected to the circular strips and extending rearwardly thereof, and means for supporting the rear ends of said extension strips above the forward edge of the platform.

17. A pick-up attachment for the platform of a harvester thrasher, said attachment comprising frame bars, a shaft journaled thereon, a toothed rake cylinder on the shaft, separate circular strips surrounding the cylinder to provide tooth passage-ways therebetween, a cross bar with independent flexible connections for mounting each circular strip, each strip including flexible straight extensions to form a grain deck, and means for supporting the rear ends of said extensions.

18. A pick-up attachment for the platform of a harvester thrasher, said attachment comprising frame bars, a shaft journaled thereon, a toothed rake cylinder on the shaft, separate circular strips surrounding the cylinder to provide tooth passage-ways therebetween, a cross bar with independent flexible connections for mounting each circular strip, each strip including flexible straight extensions to form a grain deck, brackets on the frame bars, and a roller carried on said brackets to support and strip the rear ends of said strip extensions.

19. The combination with a harvester thrasher having a ground wheel to support the same, of a pick-up device for the harvester thrasher, said pick-up device comprising a frame adapted to be connected to the harvester thrasher, a toothed raking cylinder on the said frame, a shaft for driving the same, connections from the ground wheel to drive the shaft, a grain and tooth stripping deck between the raking cylinder and harvester thrasher, a roller for supporting the rear end of said deck, and connections from the shaft to drive said roller.

In testimony whereof we affix our signatures.

CLEMMA R. RANEY.
MELVILLE J. MITCHELL.